Nov. 30, 1965   F. JAKOB ETAL   3,220,328
FLASH STRUCTURE FOR PHOTOGRAPHIC CAMERA
Filed March 11, 1963   2 Sheets-Sheet 1

INVENTOR.
FRANZ JAKOB
BY   REINHARD v. SYBEL
Michael S. Striker
ATTORNEY

Nov. 30, 1965      F. JAKOB ETAL      3,220,328
FLASH STRUCTURE FOR PHOTOGRAPHIC CAMERA
Filed March 11, 1963                    2 Sheets-Sheet 2

INVENTOR.
FRANZ JAKOB
REINHARD v. SYBEL
BY Michael S. Striker
ATTORNEY

United States Patent Office 3,220,328
Patented Nov. 30, 1965

3,220,328
FLASH STRUCTURE FOR PHOTOGRAPHIC
CAMERA
Franz Jakob, Unterhaching, near Munich, and Reinhard
v. Sybel, Kralling, near Munich, Germany, assignors to
Agfa Aktiengesellschaft, Leverkusen, Germany
Filed Mar. 11, 1963, Ser. No. 264,444
Claims priority, application Germany, Mar. 9, 1962,
A 39,664
15 Claims. (Cl. 95—11.5)

The present invention relates to cameras.

More particularly, the present invention relates to flash structure which is adapted to be used with cameras for providing flash illumination.

As is well known, there are available at the present time different types of flash devices, and these different types of flash devices are required to have their ignition synchronized differently with respect to the shutter of the camera. Most cameras are provided with adjustable devices which are capable of adjusting the electrical circuit so that the ignition will be properly synchronized for the particular type of flash device which is used with the camera. However, the proper adjustment of the ignition synchronization is not readily appreciated by many amateurs and even with experienced camera operators the adjustment of the synchronization of the ignition of the flash device is not always made as a result of carelessness, so that the flash is not properly synchronized with the operation of the shutter.

It is accordingly a primary object of the present invention to provide a camera which is capable of being used with different types of flash devices which require different synchronizations of their ignition with respect to the shutter of the camera and which at the same time does not require the operator to make any adjustments in order to guarantee proper synchronization of the ignition of the particular type of flash device which the operator chooses to use.

Another object of the present invention is to provide a camera which has a built-in flash apparatus with a structure enabling the camera to be used with a flash device of a type different from that which is adapted to be used with the built-in flash apparatus.

A further object of the present invention is to provide a camera which, at the option of the operator, can use either one of a pair of different types of flash devices and which will have structure therein automatically adjusted to provide proper synchronization for the ignition of whichever type of flash device the operator elects to use.

Still another object of the present invention is to provide a camera which is not only capable of providing proper synchronization of the ignition of different types of flash devices but which also is capable of automatically adjusting the exposure time of the shutter to an exposure time which is suitable for the particular type of flash device which the operator elects to use.

Still another object of the present invention is to provide a camera of the above type with a manually operable structure for manually setting the exposure time in a manner which will in no way interfere with the automatic setting of the exposure time according to the particular type of flash device which the operator elects to use.

Furthermore it is an object of the present invention to provide a camera of the above type which will operate automatically to ignite only one type of flash device if the operator should inadvertently have connected to the camera two different types of flash devices.

Still another object of the present invention is to provide a camera structure capable of accomplishing all of the above objects and at the same time composed of simple rugged elements which are relatively inexpensive to manufacture and assemble and which at the same time are very reliable in operation and occupy only a small amount of space.

With the above objects in view, the invention includes in a camera, a camera housing and a first and a second receiving means carried by the camera housing for respectively receiving first and second types of flash devices which are respectively required to be synchronized differently with the shutter of the camera, so that the operator has the option of using either the first type of flash device or the second type of flash device. An ignition switch means is connected electrically with both of the receiving means for completing a circuit, upon closing of the ignition switch means, through whichever type of flash device the operator elects to use. A positioning means is also carried by the camera housing, and this positioning means responds automatically to use of the first receiving means for assuming a given position, the positioning means of the invention operatively engaging the ignition switch means for displacing the latter, upon use of the first receiving means, to a position which will provide proper synchronization of the ignition of the first type of flash device, and the ignition switch means automatically assumes, when the first receiving means is not used, a second position providing proper synchronization for the ignition of the second type of flash device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
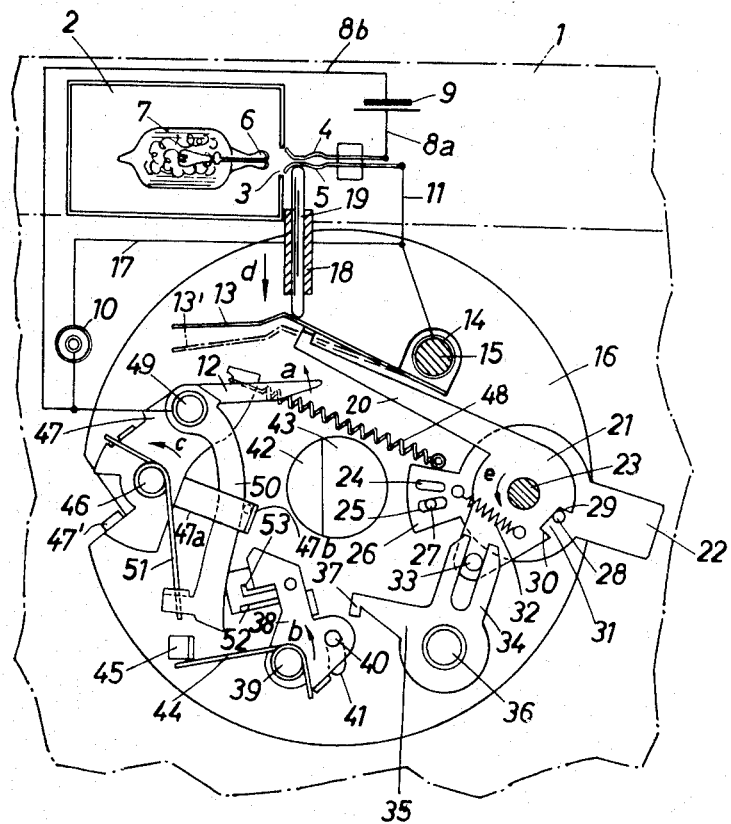
FIG. 1 is a partly schematic elevation of one possible embodiment of a structure according to the present invention.

Referring now to FIG. 1, there is diagrammatically illustrated therein, in dot-dash lines, a camera housing 1 which carries at its upper front portion a forwardly directed, trough-shaped, elongated, horizontally extending reflector 2 which forms part of a built-in flash apparatus of the camera. At its right side, as viewed in FIG. 1, the reflector 2 is formed with an opening 3 through which access may be had to a pair of springy contacts 4 and 5 which form a socket for receiving the base 6 of a flash lamp 7. Thus, the elements 4 and 5 form a receiving means for receiving the flash device in the form of a flash lamp 7.

The contact spring 4, which forms part of the receiving means for the lamp 7, is connected through a conductor 8a with a source of current 9, and the latter is connected through a conductor 8b with a contact lever 12 which forms a movable contact member of an ignition switch means as described below. The contact spring 5, which forms also a movable element of the receiving means 4, 5 is connected through a conductor 11 with an elongated contact spring 13 which forms an adjustable stationary contact of the ignition switch means 12, 13. The conductors 8b and 11 are also interconnected with each other through a conductor 17 which is connected to a receiving means 10 for receiving a flash device different from the flash device 7. Thus, the receiving means 10 may be in the form of a socket for receiving a plug of an electronic flash unit which, of course, is a type of flash device different from the flash device 7 and for proper operation the ignition of the type of flash device which is connected to the camera through the receiving means 10 must be synchronized with the shutter differently from the synchronization of the ignition of the flash lamp 7. It will be noted that with this electrical circuit the first receiving means 4, 5 and the second receiving means 10 are electrically connected in parallel with each other and the ignition switch means 12, 13 is a single switch electrically connected with both of the receiving means for completing a circuit therethrough in a manner described below. The movable contact member 12 of the ignition swtich means swings, during operation of the shutter, in the direction of the arrow $a$ of FIG. 1 and the stationary contact 13 is located in the path of movement of the movable contact 12 to be engaged hereby for closing a circuit through and igniting whichever type of flash device the operator has elected to use. The springy contact member 13 is fixedly mounted on a stationary pin 15 which is carried by a wall 16 of the shutter assembly, this wall 16 also being stationary, and the stationary pin 15 is surrounded by an insulating sleeve 14 which is located between the pin 15 and the contact 13 so that this contact 13 is in this way insulated from the pin 15 while being fixedly mounted thereby.

The solid-line position of the springy contact 13 which is shown in FIG. 1 is the rest position of the spring 13 which this spring occupies due to its own inherent resiliency, and in this rest position of the spring 13 it is located to provide proper synchronization for ignition of an electronic flash unit connected to the receiving means 10. In order to provide proper synchronization for the ignition of the flash lamp 7 it is necessary to locate the contact 13 closer to the movable contact 12 so that the ignition circuit will be closed at an earlier instant during the operation of the shutter of the camera, and the spring 13 must be deflected to the position 13′ indicated in dot-dash lines in FIG. 1 in order to provide proper synchronization for the ignition of the flash device 7. The structure of the invention includes a positioning means which responds automatically to use of the receiving means 4, 5 for automatically positioning the contact 13 at the position 13′ so as to automatically provide proper synchronization of the ignition of the flash lamp 7 whenever the latter is introduced into the receiving means 4, 5. This positioning means includes an elongated positioning pin 19 made of a suitable electrically non-conductive material such as any suitable plastic, and this elongated pin 19 is slidably guided by a stationary sleeve 18 fixedly mounted on any suitable stationary part of the camera. It will be noted that the pin 19 extends between and engages the spingy contacts 5 and 13 and the length of the pin 19 is such that it just touches the contact 5 when there is no lamp 7 in the receiving means 4, 5 and when the spring 13 is in its rest position where it will provide proper synchronization for a flash device of the type which is used with the receiving means 10. Thus, whenever the operator inserts a flash lamp 7 into the receiving means 4, 5, the movable element 5 of this receiving means will be moved from the illustrated rest position thereof downwardly, as viewed in FIG. 1, to an active position, and during this movement the element 5 will shift the positioning means 19 downwardly in the direction of the arrow $d$ shown in FIG. 1, with the result that the adjustable stationary contact 13 will be deflected from the solid to the dot-dash line position 13′ automatically providing proper synchronization of the ignition of the flash lamp 7 whenever a flash lamp is introduced into the receiving means 4, 5.

The shutter of the camera is capable of having its exposure time set so as to provide at least two different exposure times one of which is suitable for a flash device of the type exemplified by the lamp 7 and the other of which is suitable for a flash device of the type exemplified by an electronic flash unit adapted to be connected to the receiving means 10, and the structure of the invention is capable of automatically setting the exposure time to provide a proper exposure time for the particular type of flash device which is used. This latter structure includes an adjusting means formed by an elongated arm 20 which engages the side of the spring 13 opposite from the side thereof which is engaged by the positioning means 19, and this elongated arm 20 carries at its free end which engages the contact 13 a small block or coating of electrically non-conductive material so that the arm 20 is insulated from the contact 13. The adjusting means which is formed by the arm 20 is operatively connected to a manually operable exposure time adjusting means 21, 22, this manually operable means including the parts 21 and 22 which are supported for free turning movement one relative to the other by a stationary pin 23 also carried by the wall 16 of the shutter assembly. A spring 32 is connected to a pair of stationary pins respectively carried by the turnable parts 21 and 22 of the manually operable exposure time setting means, and the part 22 fixedly carries a pin 28 located within a notch 31 formed in the part 21 and having a pair of end surfaces 29 and 30 which are adapted respectively to engage the pin 28. It will be noted that the spring 32 urges the part 21 to turn in a clockwise direction, as viewed in FIG. 1, to a position where the end 29 of the notch 31 engages the pin 28. On the other hand, when a lamp 7 is introduced into the receiving means 4, 5, the movable element 5 thereof will displace the positioning means 19 downwardly so as to displace the spring 13 from the solid line position of FIG. 1 to the dot-dash line position 13′, and the deflection of the spring 13 in this way is transmitted through the automatic adjusting means 20 for turning the part 21 independently of the part 22 in opposition to the spring 32, so that in this way it is possible to automatically set the exposure time to a time suitable for the flash lamp 7 even if the manually operable means 21, 22 has previously been placed in a position providing an exposure time which is too short for the flash lamp 7.

The part 22 of the manually operable exposure time setting means is formed with a pair of detent slots 24 and 25 adapted to selectively receive a spring-pressed detent element 27 such as a suitable spring-pressed ball carried by the wall 16 in a suitable recess thereof, and in this way the detent structure 24–27 is capable of yieldably retaining the part 22 in one of the pair of positions selected by the operator, and it will be noted that the detent slots 24 and 25 are formed in an extension 26 of the rotary part 22 of the manually operable exposure time setting means.

The rotary member 21 of the manually operable exposure time setting means fixedly carries a pin 33 which extends into an elongated radial slot or notch formed in a rotary member 34 supported for turning movement by a stationary pin 36 which is carried by the plate 16 of the shutter assembly. This rotary member 34 carries an extension 35 the angular position of which determines the exposure time. The extension 35 is provided at its free end with a stop portion 37, and in the position of the extension 35 shown in FIG. 1, the stop portion 37 thereof is located in the path of turning of a shutter drive lever 38 which is supported for turning movement by a stationary pin 39, carried by the shutter plate 16. This drive lever 38 fixedly carries a pin 40 which extends through an arcuate slot 41 formed in the plate 16 and extending along a circle whose center is in the axis of the pin 39, and the pin 40 extends into unillustrated slots of a pair of shutter blades 42 and 43 which are located behind the plate 16, parts of these shutter blades being visible through the center exposure aperture of the plate 16, as is apparent from FIG. 1. These shutter blades 42 and 43 form a well-known type of shutter where a pair of shutter blades turn toward and away from each other in the manner of a pair of scissors blades, and in a manner well known in the art the pin 40 extends into a pair of slots of the blades 42 and 43 these slots crossing over each other in such a way that when the pin 40 is in the position illustrated in FIG. 1 the blades 42 and 43 partially overlap each other at the exposure aperture to close the exposure aperture while when the pin 40 is displaced downwardly, as viewed in FIG. 1, it acts through the slots of the blades 42 and 43 on these blades to simultaneously turn them away from each other so as to open the exposure aperture and make an exposure in a manner well known in the art. A hair spring 44 is wound around the pin 39 and has one leg engaging a stationary member 45 carried by the plate 16 and its opposite leg engaging a lug of the drive lever 38 to urge the latter in the direction of the arrow b, and in this way the pin 40 is located by the spring 44 at the upper end of the slot 41, this upper end of the slot 41 cooperating with the pin 40 to limit the turning of the lever 38 by the spring 44. In order to open the shutter there is provided a manually turnable lever 47 which is capable of being turned by the operator first to cock the shutter and then to release the shutter so that it will be first opened and then closed, and this manually turnable lever is supported for turning movement by a stationary pin 46 carried by the plate 16, and any suitable member which is connected to the lever 47 is accessible to the operator so that the operator can turn the lever 47 in a counterclockwise direction as viewed in FIG. 1, in order to cock and release the shutter. Thus, there is fixed to the lever 47 a projection 47a having at its end an extension 47b extending to the exterior of the camera and accessible to the operator so that the operator can engage the extension 47b and turn the lever 47 about the pin 46. A return spring 48 is connected at one end to the lever 47 and at an opposite end to a stationary pin carried by the wall 16 for urging the lever 47 in a clockwise direction to the illustrated rest position where an edge of the lever 47 engages a stationary stop member 47' carried by or formed integrally with the plate 16. The lever 47 fixedly carries a pin 49 which serves to turnably support on the lever 47 for turning movement therewith as well as for turning movement relative thereto a lever 50 which is acted upon by a further hair spring 51 coiled in part about the pin 46 and having a pair of free ends one of which engages a lug of the lever 47 and the other of which engages a lug of the lever 50 so that the spring 51 when tensioned is capable of swinging the lever 50 forcefully in a counterclockwise direction, as viewed in FIG. 1, about the pin 49, and the contact member 12 forms an extension of the swing-lever 50 so as to turn therewith.

In order to make an exposure the operator turns the lever 47 in the direction of the arrow c shown in FIG. 1, and during this manual turning of the lever 47 the lever 50 engages a projection 52 fixedly carried by the plate 16 and located in the path of movement of the lever 50 during turning of the lever 47 in the direction of the arrow c. The continued turning of the lever 47 takes place not only in opposition to the spring 48 but also in opposition to the spring 51 which becomes tensioned while the lever 50 slides upwardly along the left end of the projection 52, and in this way the spring 51 is continuously tensioned to increasing degree. This action continues until the tip of the lever 50 rides off the projection 52 whereupon the tensioned spring 51 forcefully throws the lever 50 about the pin 49 relative to the lever 47, and the free end of the lever 50 forcefully engages the projection 53 carried by the shutter drive lever 38 so as to turn this lever 38 in a clockwise direction about the pin 39, the spring 51 being tensioned sufficiently so that the lever 38 can be turned in opposition to the spring 44 and of course the pin 40 will move downwardly along the slot 41 and the shutter blades 42 and 43 will open so as to enable an exposure to be made. After the lever 30 has been turned by the swing-lever 50 in a clockwise direction, as viewed in FIG. 1, in order to open the shutter, the spring 44 acts to return the lever 38 to its initial position, and in this way the shutter is closed. In the illustrated position of the arm 35 of the exposure time determining member 34, the stop portion 37 of the arm 35 limits the turning of the lever 38 since the stop portion 37 is located in the path of turning of the lever 38 and is engaged by the latter, so that the return of the lever 38 toward its starting position takes place sooner than if the stop portion 37 were not located in the path of turning of a portion of the lever 38. When the part 22 of the manually operable exposure-time setting means has been displaced to a position where the element 27 is located in the slot 24 the member 34 is displaced in a clockwise direction from the position thereof shown in FIG. 1 with consequent clockwise displacement of the arm 35 and the stop 37, and in this latter position the stop 37 is not engaged by the lever 38 when the latter is turned by the lever 50, so that at this time a longer exposure time is provided. Thus, when the parts have the position shown in FIG. 1 a shorter exposure time will be provided. On the other hand, with the spring 13 in the solid-line position shown in FIG. 1 the movable contact member 12 must turn through a larger distance before it reaches and engages the spring 13 in order to close the circuit, and therefore, with the parts in the position of FIG. 1 the shorter exposure time with the longer travel of the movable contact member 12 will be provided so that in the position of the parts shown in FIG. 1 where the spring 13 has the solid-line position shown in FIG. 1 and where the extension 35 of the exposure time setting structure is in the position illustrated in FIG. 1 synchronization suitable for an electronic flash unit is provided and an exposure time suitable for an electronic flash unit is provided, so that with the parts in the position of FIG. 1 if the operator elects to use the receiving means 10 proper operation will be assured.

If the operator should choose to make an exposure using the flash device 7, then a longer exposure time is required and also the moment of ignition is required to take place earlier during the operation of the shutter. Thus, when the operator introduces the lamp 7 into the receiving means 4, 5, the base 6 of the lamp 7 deflects the element 5 of the receiving means to its active position displacing the positioning means 19 downwardly in the direction of the arrow d, so that the spring 13 assumes the position 13', as described above, and therefore the moment of ignition will take place earlier during the operation of the shutter. The adjustment of the contact 13 of the ignition switch means 12, 13 to the position 13' causes the adjusting means 20 to be turned so that the part 21 of the manually operable exposure time setting means 21, 22 turns independently of the part 22 in the direction of the arrow e thus displacing the arm 35 in a clockwise direction about the pin 36 even if the part 22 remains in the position illustrated in FIG. 1, so that in this way the position of a longer exposure time when the lamp 7 is used is guaranteed irrespective of any manual setting made by the operator. Thus, even if the member 22 should be in the position illustrated in FIG. 1, it is possible for the part 21 to turn in the direction of the arrow e in opposition to the spring 32 displacing the end 29 of the notch 31 away from the pin 28 and providing automatically the setting for the longer exposure time. Thus, with the structure of FIG. 1 whenever the operator elects to use the flash device 7 the ignition switch means 12, 13 will be adjusted so as to provide proper synchronization of the ignition of the lamp 7 and also the exposure time will be automatically adjusted to provide a proper exposure time.

Figure 2:
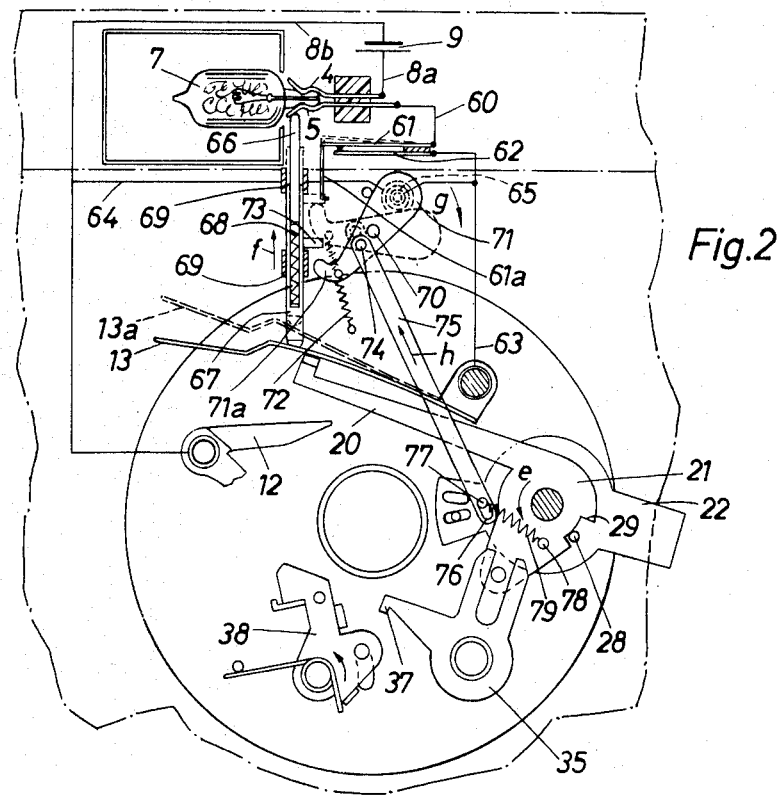
FIG. 2 is a partly schematic illustration of another embodiment of a structure according to the present invention.

Another embodiment of the invention is illustrated in FIG. 2, and while the shutter structure is not illustrated in FIG. 2 in its entirety, it is to be understood that the unillustrated elements of FIG. 2 have the same structure as the elements of FIG. 1.

With the embodiment of FIG. 2 not only is the ignition of the lamp 7 synchronized with the operation of the shutter, but in addition the use of the second receiving means for a different type of flash device such as an electronic flash lamp also acts to positively position part of the structure, and the synchronization of the ignition of the electronic flash unit, for example, is positively controlled by attaching the electronic flash unit to the receiving means provided therefor.

With the structure shown in FIG. 2, the springy contact member 4 of the receiving means 4, 5 is again connected through a conductor 8a with a source of current 9 and the conductor 8b is connected with the movable contact lever 12 of the ignition switch means. The element 5 of the receiving means 4, 5 is connected through a conductor 60 with a springy contact member 61 of an interruptor switch 61, 62, the springy contact member 61 being displaceable toward and away from the stationary contact member 62 of the switch 61, 62. The switch member 62 is connected with the adjustable, stationary springy contact member 13 of the ignition switch means 12, 13, this latter connection being through the conductor 63. In parallel with the receiving means 4, 5 there is a receiving means 65 in the form of a suitable socket for receiving a plug of another type of flash device such as an electronic flash unit, and the receiving means 65 is connected to the conductors 8b and 63 by an elongated conductor 64, so that in the case of FIG. 2 also the pair of receiving means are connected in parallel with each other and the single ignition switch means when closed is capable of completing a circuit through whichever one of the flash devices the operator elects to use.

The positioning means of FIG. 2 includes an elongated pin 66 which is slidable within an elongated hollow sleeve 67 which is closed at its bottom end, as viewed in FIG. 2, and within the hollow sleeve 67 is located a spring 68 which urges the pin 66 outwardly of the sleeve 67 of the positioning means 66, 67 of this embodiment. A pair of stationary bearings 69 serve to guide the sleeve 67 for linear, longitudinal movement. The closed end of the sleeve 67 engages the springy contact member 13 of the ignition switch means, in the same way as the positioning means 19.

In the region of the positioning means 66, 67, the camera housing fixedly carries a stationary pin 70 on which a lever 71 is pivoted, and this lever acts as a cover for covering the receiving means 65 when this latter receiving means is not used. A spring 72 is fixed to a stationary member at one end and at its opposite end is fixed to a pin carried by the lever 71 so as to urge the latter to turn in a counterclockwise direction, as viewed in FIG. 2, about the pin 70, and the movement of the lever 71 by the spring 72 is limited by a suitable stationary pin which engages the left edge of the covering lever 71 adjacent the upper end thereof, as shown in FIG. 2. Thus, the spring 72 yieldably holds the covering lever 71 in its covering position preventing introduction of the flash device into the receiving means 65. The free end 71a of the covering lever 71 cooperates with a projection 73 fixedly carried by the sleeve 67, and this projection 73 is located in the path of turning of the lever 71 in opposition to the spring 72 so that when the lever 71 turns in a clockwise direction, as viewed in FIG. 2, the free end 71a of the lever 71 will engage the projection 73 and will advance the sleeve 67 upwardly in the direction of the arrow f shown in FIG. 2. The springy contact member 61 of the interrupter switch 61, 62 is located in the path of upward movement of the projection 73 so that when the lever 71 is turned to the dotted line position shown in FIG. 2 the projection 73 will engage the projection 61a of the springy switch member 61 and will displace the latter away from the switch member 62, thus opening the interruptor switch 61, 62. Thus, with this construction whenever the operator chooses to use the type of flash device which requires the receiving means 65, the cover lever 71 will necessarily be displaced to the dotted line position uncovering the receiving means 65 so that the latter will be available for use, and the result of turning of the lever 71 to the dotted line position shown in FIG. 2 is not only that the sleeve 67 will be displaced upwardly from the position thereof shown in FIG. 2 but also that the interruptor switch 61, 62 will be open so that even if the operator should inadvertently have placed within the receiving means 4, 5 a lamp 7 which has not been ignited nevertheless even though the operator has forgotten to remove this lamp the circuit cannot be completed through the lamp 7 and instead the structure will operate with the type of flash device which is used with the receiving means 65.

The cover lever 71 fixedly carries a pin 74 to which one end of a link 75 is pivoted so that in this way there is a pivotal connection between the link 75 and the lever 71, and the other end of the link 75 is formed with an elongated slot 76 receiving a pin 77 which is fixed to the manually turnable part 22 of the manually operable exposure time setting means 21, 22. An elongated spring 79 is fixed at one end to the pin 77 and at its opposite end to a pin 78 which is carried by the turnable part 21 of the exposure time setting means, so that the spring 79 seeks to turn the part 21 in a clockwise direction relative to the part 22.

The parts are illustrated in FIG. 2 in the position where a lamp 7 has been inserted into the receiving means 4, 5. Thus, the movable element 5 of the receiving means 4, 5 has been displaced from its rest to its active position where it displaces the positioning means 66–68 downwardly and thus displaces the springy contact member 13 from the dotted line position 13a, which is the rest position thereof, to the illustrated solid line position where the ignition switch member 13 is located closer to the movable contact member 12 to be engaged by the latter at an earlier instant during the operation of the shutter so as to provide proper synchronization of the ignition of the lamp 7. This movement of the member 13 to the solid-line position illustrated in FIG. 2 is brought about because the spring 68 is stronger than the resilient force of the contact spring 13 and the force of the spring 79. Thus, the movement of the adjustable stationary member 13 of the ignition switch 12, 13 from the dotted to the solid line position shown in FIG. 2 will result in turning of the automatic adjusting means 20 downwardly with consequent turning of the part 21 in the direction of the arrow e in opposition to the spring 79 so that the member 21 and thus the member 35 assume the same position which they would have if the part 22 is set by the operator to provide a longer exposure time. It will be noted from a comparison of FIGS. 1 and 2 that the stop portion 37 of the exposure time determining member 35 is located in FIG. 2 at a position relative to the shutter-drive lever 38 different from that in FIG. 1, and in the position shown in FIG. 2 the stop portion 37 does not engage the lever 38 while in the position of the member 35 shown in FIG. 1 the slot portion 37 thereof does engage a part of the lever 38 so that with the parts in the position of FIG. 1 a relatively short exposure time will be provided while with the parts in the position of FIG. 2 a relatively long exposure time will be provided.

If it is desired to use the apparatus of FIG. 2 with another type of flash device such as an electronic flash unit instead of the flash lamp 7, then the operator will turn the lever 71 with the plug of the electronic flash unit displacing the lever 71 to its position uncovering the receiving means 65 whereupon the plug can be inserted into the receiving means 65. Thus, the lever 71 will be turned in connection with insertion of the plug of the electronic flash unit into the receiving means 65 in the direction of the arrow g causing the end 71a of the lever 71 to engage the projection 73 and displace the sleeve 67 upwardly in opposition to the spring 68 so that the springy switch member 13 will assume by its own inherent resiliency the rest position 13a where it is located further from the movable contact lever 12 so as to provide proper synchronization for the type of flash device which is used with the receiving means 65. Of course, the pin 66 and sleeve 67 are made of electrically non-conductive material in the same way as the positioning means 19, and also the automatic adjusting arm 20 provided with a coating or with a block of insulating material which engages the contact 13. The movement of the projection 73 by the lever 71 will also result in opening of the interruptor switch 61, 62, as described above. Furthermore, the turning of the lever 71 displaces the link 75 in the direction of the arrow h so that the pin 77 will be engaged by the lower end of the slot 76 to be displaced to the position illustrated in FIG. 2 in the event that the member 22 happens to be in a position providing a shorter exposure time. Of course, the member 22 is shown in FIG. 2 in the position providing a longer exposure time so that the link 75 with the slot 76 simply move relative to the pin 77 which remains in the illustrated position, but of course the bottom end of the slot 76 will engage the pin 77 without moving the latter from the position shown in FIG. 2. Thus, if the member 22 had been in a position providing a shorter exposure time the link 75 would have acted on the pin 77 to displace the member 22 to the position illustrated in FIG. 2 so as to automatically set the member 22 for providing the longer exposure time, and it will be noted that when the contact 13 moves to the rest position 13a the spring 79 is capable of turning the member 21 in a direction opposite to that indicated by the arrow e to the position where the stop portion 37 is located in the path of movement of the lever 38 so as to provide the shorter exposure time, and of course in this position the end 29 of the notch of the rotary part 21 of the manually operable exposure time setting means engages the pin 28, as described above in connection with FIG. 1. Thus, with the embodiment of FIG. 2 irrespective of any settings previously made by the operator the exposure time will be automatically set to a time which is suitable for the particular type of flash device which the operator elects to use and also with the embodiment of FIG. 2 there will be automatic synchronization of the ignition of the particular type of flash device which the operator elects to use with the operation of the shutter.

Of course, the structure may be simplified to some extent by eliminating the positioning means 66–69 and instead constructing the lever 71 and the link 75 so that these elements control the position of the switch member 13, so that with such a construction the positioning means would be connected directly with the structure which controls the exposure time. Moreover, it is also possible to use, instead of a turnable covering lever 71, a shiftable cover member which may be supported for sliding movement by any suitable guiding structure.

Figure 3:
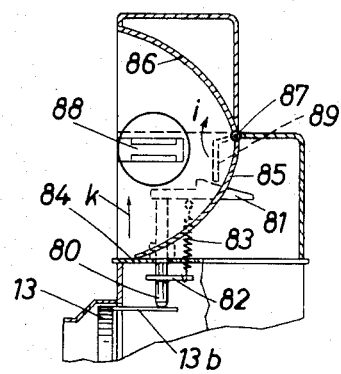
FIG. 3 is a fragmentary sectional, partly diagrammatic elevation showing a third possible embodiment of a structure according to the present invention.

With the embodiment of FIG. 3 there is provided a shutter structure similar to that of FIG. 1. The contact 13 assumes in its rest position a location which will provide proper synchronization for ignition of the electronic flash unit. In order to displace the contact 13 into the position providing proper synchronization for the ignition of the flash lamp, the spring 13 is provided in the embodiment of FIG. 3 with a projection 13b which is engaged by an end of a pin 80 of the positioning means of FIG. 3. The other end of the pin 80 fixedly carries an arm 81 having an upper inclined surface and also the pin 80 fixedly carries a projection 82 connected to the lower end of a spring 83 which is connected at its top end to a stationary member so as to urge the pin 80 upwardly in the direction of the arrow k shown in FIG. 3, the upward movement of the pin 80 being limited by engagement of the projection 82 with the underside of a plate 84 through an opening in which the pin 80 extends, as shown in FIG. 3.

The built-in flash apparatus of the camera of FIG. 3 includes a reflector having a pair of reflector sections 85 and 86, the reflector section 85 being stationary while the reflector section 86 is hingedly connected to the upper edge of the stationary reflector section 85 by a hinge 87 so that the movable reflector section 86 can be turned upwardly from a rest position to the position illustrated in FIG. 3 where the movable reflector section 86 forms an extension of the stationary reflector section 85. Thus, the operator turns the movable reflector section 86 in the direction of the arrow i to the position illustrated in FIG. 3 in order to place the built-in flash apparatus in a position where it can be used, and it will be noted that this turning of the movable reflector section 86 to the position illustrated in FIG. 3 uncovers the socket 88 for the flash lamp so that a flash lamp can be introduced into the socket 88, so that with the embodiment of FIG. 3 the built-in flash apparatus also forms a receiving means for receiving a flash lamp and which when it is set for use will automatically position the springy adjustable stationary contact member of the ignition switch means in the position which will provide proper synchronization of the ignition of a flash lamp. This latter result is achieved by an extension 89 of the turnable reflector section 86. When the reflector section 86 is turned in the direction of the arrow i the projection 89 thereof rides along the upper inclined surface of the projection 81 of the pin 80, and the engagement of the projection 89 with the arm 81 displaces the positioning means 80 downwardly in opposition to the spring 83 which is illustrated in FIG. 3 where the contact 13 is located closer to the movable contact lever 12 to provide proper synchronization for a flash lamp, so that when the receiving means of FIG. 3 is used the ignition switch means will be automatically synchronized to provide proper ignition. Of course, with this embodiment also when the receiving means shown in FIG. 3 is not used, the reflector section 86 will of course be in its closed position and the projection 82 will engage the underside of the plate 84 so that the spring member 13 will automatically assume a position providing proper synchronization for the other type of flash device.

Of course, the invention is not necessarily limited to the details described above, and in particular the invention can be used with shutters having a structure different from that which has been illustrated and described above only by way of example.

It will be understood that each of the elements described above, or two or more together, may also find a useful application in other types of cameras differing from the types described above.

While the invention has been illustrated and described as embodied in cameras with flash apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing; first and second receiving means carried by said camera housing for respectively receiving a first type of flash device and a second type of flash device which are respectively required to be synchronized differently with the shutter of the camera, therefor or said second type of flash device with said second receiving means; positioning means carried by said camera housing and responding automatically at least to location of said first type of flash device in said first receiving means for assuming a first position, said positioinng means automatically assuming a second position when said second type of flash device is used; and a single, ignition switch means connected electrically with both of said receiving means for completing a circuit through whichever type of flash device is used, said positioning means engaging said switch means for automatically placing the latter in a position providing proper synchronization of the ignition of the first type of flash device when the latter is placed in said first receiving means and for placing said switch means in a second position providing proper synchronization of the ignition of said second type of switch device when the latter is placed in said second receiving means.

2. In a camera, in combination, a camera housing; first and second receiving means carried by said camera housing for respectively receiving first and second types of flash devices respectively requiring different synchronizations with respect to the shutter of the camera, said first and second receiving means respectively including first and second movable elements which respectively have rest positions when said first and second receiving means are not used and which are respectively displaced from said rest positions to active positions when said first and second receiving means are used, ignition switch means connected electrically to both of said receiving means for closing a circuit, upon closing of said ignition switch means, through whichever one of the types of flash devices is used; and positioning means located in the path of movement of both of said movable elements from said rest to said active positions thereof to be located in a first position upon movement of said movable element of said first receiving means from said rest to said active position thereof and in a second position upon movement of said movable element of said second receiving means from said rest to said active position thereof, and said positioning means operatively engaging said switch means for locating the latter in a first position providing proper synchronization for said first type of flash device when said movable element of said first receiving means is in said active position thereof and in a second position providing proper synchronization for said second type of flash device when said movable element of said second receiving means is in said active position thereof.

3. In a camera as recited in claim 2, said movable element of said second receiving means being a cover which in the rest position of said movable element covers said second receiving means and which is displaced by attachment of said second type of flash device to said second receiving means from said rest position covering said second receiving means to said active position, and said movable element of said second receiving means uncovering said second receiving means when said movable element of said second receiving means is displaced to said active position thereof.

4. In a camera as recited in claim 2, said first receiving means including a reflector having a pair of reflector sections one of which is stationary and the other of which is movable from a rest position closing said reflector to an active position opening said reflector, said movable reflector section having a portion which engages said positioning means to move the latter to a position locating said switch means in said position providing proper synchronization for said first type of flash device when said movable reflector section is moved to said active position thereof.

5. In a camera, in combination, first and second receiving means for respectively receiving first and second types of flash devices which are respectively required to be synchronized differently with the shutter of the camera; ignition switch means connected electrically to both of said receiving means for completing a circuit, upon closing of said ignition switch means, through whichever type of flash device is used; positioning means carried by said camera housing and responding automatically to use of said first receiving means for positioning said ignition switch means in a position providing proper synchronization of the ignition of said first type of flash device, said ignition switch means and positioning means automatically assuming a second position providing proper synchronization for the ignition of said second type of switch device when said first receiving means is not used; exposure time setting means having at least two positions providing at least two different exposure times one of which is suitable for said first type of flash device and the other of which is suitable for said second type of flash device; and adjusting means operatively connected to said exposure time setting means and responding automatically to location of said positioning means and switch means in said first and second positions thereof for automatically adjusting said exposure time setting means to a position providing an exposure time proper for said first type of flash device when said first receiving means is used and proper for said second type of flash device when said second receiving means is used.

6. In a camera, in combination, a camera housing; first and second receiving means carried by said camera housing for respectively receiving first and second types of flash devices which respectively require different synchronizations with the shutter of the camera, said first receiving means including a movable element which moves from a rest position to an active position when said first receiving means is used; ignition switch means connected electrically with both of said receiving means for completing a circuit, upon closing of said ignition switch means, through whichever type of flash device is used, said ignition switch means including a movable contact movable along a predetermined path and a stationary springy contact located in the path of movement of said movable contact to be engaged thereby for closing the circuit through the particular flash device which is used; and an elongated positioning pin guided for longitudinal movement and having one end engaging said element of said first receiving means and an opposite end engaging said springy contact for displacing the latter from a given rest position to a postion providing proper synchronization of the ignition of said first type of flash device when said element of said first receiving means is moved from said rest to said active position thereof upon use said first type of flash device, said springy contact in said rest postion thereof providing proper synchronization for the ignition of said second type of flash device.

7. In a camera, in combination, a camera housing; first and second receiving means carried by said camera housing for respectively receiving first and second types of flash devices which respectively are required to be synchronized differently with respect to the shutter of the camera, a single ignition switch means connected electrically to both of said receiving means for completing a circuit, upon closing of said ignition switch means, through whichever type of flash device is used; positioning means responding automatically to use of said first receiving means and operatively engaging said switch means for automatically placing the latter in a position providing proper synchronization of the ignition of said first type of flash device, said positioning means and switch means automatically assuming a second position providing proper synchronization for the ignition of said second type of flash device when said first receiving means is not used; exposure time setting means operatively connected to the shutter of the camera for providing at least two exposure times one of which is suitable for said first type of flash device and the other of which is suitable for said second type of flash device; manually operable means operatively connected to said exposure time setting means for manually setting the latter in one or the other of said positions thereof; and adjusting means operatingly connected to said exposure time setting means and responding automatically to location of said positioning means and switch means in said first or second position thereof for automatically locating said exposure time setting means in a position providing proper exposure time for said first type of flash device or in a position providing a proper exposure time for said second type of flash device, respectively.

8. In a camera as recited in claim 7, said manually operable means including a first part accessible to the operator to be manually positioned by the operator and a second part movable with respect to said first part and operatively connected to said exposure time setting means, said spring means operatively connected to said parts of said manually operable means for positioning the latter in a predetermined position with respect to each other while providing for yieldable resilient movement of said second part with respect to said first part, said adjusting means being operatively connected to said second part of said manually operable means for acting through the latter on said exposure time setting means independently of said first part of said manually operable means.

9. In a camera, in combination, electrical ignition switch means having a first and a second rest position, said first rest postion providing proper co-operation with a first type of flash device and said second rest position providing proper co-operation with a second type of flash device; biasing means permanently tending to move said switch means from said second into said first rest position thereof; first receiving means for receiving said first type of flash device and cooperating with said switch means when the same has been moved by said biasing means into said first rest position thereof; second receiving means arranged independently of and spaced from said first receiving means and serving for receiving said second type of flash device; and positioning means operatively connected to said switch means and second receiving means for responding to reception of said second type of flash device by said second receiving means to move said switch means against action of said biasing means from said first into said second rest position thereof, providing proper cooperation with said second type of flash device and simultaneously preventing, due to movement of said switch means from said first into said second rest position thereof, proper cooperation of a first type of flash device inserted into said first receiving means with said switch means, while upon removal of said second type of flash device from said second receiving means said switch means is automatically returned by said biasing means into said first rest position thereof, then permitting proper co-operation between a first type of flash device inserted into said first receiving means and said switch means.

10. The combination set forth in claim 9, further comprising a camera housing carrying said first and second receiving means and said positioning means, and wherein said ignition switch means are electrically connected with both of said receiving means for completing a circuit through whichever flash device is used.

11. The combination set forth in claim 10, wherein said switch means is open in said first and second rest positions thereof, and completes the circuit through whichever flash device is used when said switch means closes.

12. The arrangement as set forth in claim 9, wherein said second receiving means includes a movable element displaced from a rest position to an active position when receiving said second type of flash device and said positioning means operatively engaging said element of said second receiving means and said switch means for transmitting movement of said element from said rest to said active position thereof to said switch means for displacing the latter from said first into said second rest position thereof.

13. The arrangement set forth in claim 9, wherein said ignition switch means includes a movable contact which moves through a given path during operation of the shutter of the camera, and an adjustable stationary contact capable of having its position relative to said moving contact adjusted so as to be located at a distance from said movable contact which will provide a given synchronization of the ignition of the flash devices, said stationary contact having one rest position corresponding to said first rest position of said switch means and another rest position corresponding to said second rest position of said switch means.

14. The arrangement set forth in claim 9, further comprising a camera housing and a built-in flash apparatus carried by said camera housing, said second receiving means constituting a part of said built-in flash apparatus and said positioning means responding automatically to use of said built-in flash apparatus.

15. The arrangement set forth in claim 9, wherein said second type of flash device is a flash lamp.

References Cited by the Examiner
FOREIGN PATENTS
930,434  7/1955  Germany.

JOHN M. HORAN, *Primary Examiner.*